United States Patent [19]
Young

[11] 3,756,081
[45] Sept. 4, 1973

[54] DISPLACEMENT TRANSDUCERS

[76] Inventor: Robert Eric Young, 12 Whitnash Rd., Leamington Spa, England

[22] Filed: May 21, 1971

[21] Appl. No.: 145,671

[30] Foreign Application Priority Data
May 21, 1970 Great Britain................... 24,541/70

[52] U.S. Cl................. 73/336.5, 73/362 R, 331/65, 331/40, 331/117 R, 336/129, 336/75, 340/199, 340/195
[51] Int. Cl........................ G01n 27/72, G01r 27/26
[58] Field of Search........................... 340/195, 199; 331/65, 66, 181, 40, 117 R; 73/336.5, 335, 362 R, 398 R, 290; 336/129, 130, 75

[56] References Cited
UNITED STATES PATENTS
2,444,218   6/1948   Carnahan............................ 331/181
3,140,450   7/1964   Tavis.................................. 340/195
3,368,755   2/1968   Smith.................................. 73/337
  164,275   6/1875   Draper............................. 73/336.5

Primary Examiner—Richard C. Queisser
Assistant Examiner—Denis E. Corr
Attorney—Sughrue, Rothwell, Mion, Zinn and Macpeak

[57] ABSTRACT

A transducer for converting mechanical displacement into an electrical signal comprises a length of resistive wire movable in an inductance coil to change its inductance. Preferably the inductance coil is included in an oscillator circuit the frequency of which is compared with another oscillator to provide a frequency difference signal as a digital representation of the mechanical movement. Simple practical examples of its uses are described.

10 Claims, 5 Drawing Figures

INVENTOR
ROBERT ERIC YOUNG
BY Sughrue, Rothwell, Mion,
Zinn & MacPeak
ATTORNEYS

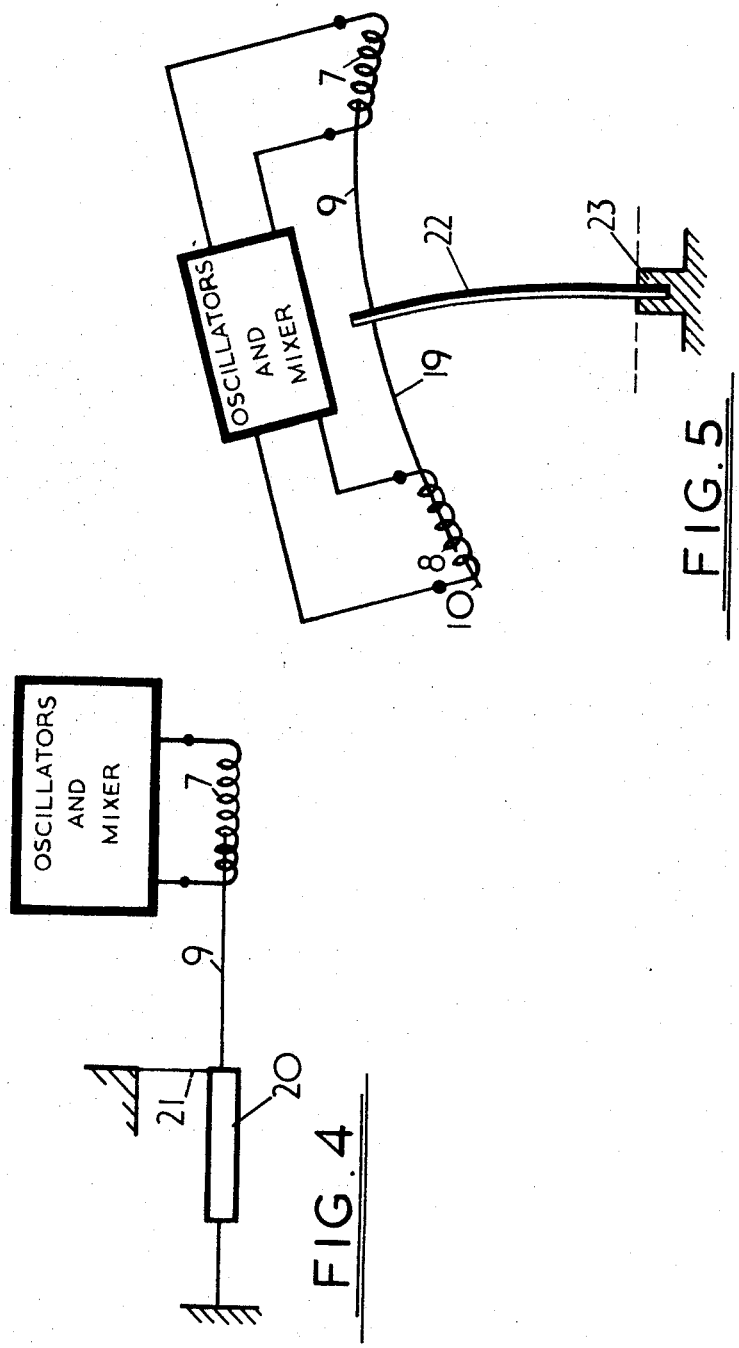

DISPLACEMENT TRANSDUCERS

This invention relates to displacement transducers for receiving the displacement of a member as an input and providing an electrical output corresponding to the displacement.

According to the invention, a displacement transducer comprises an elongate member of electrically resistive material which is to be displaced in accordance with the displacement to be measured, an inductance coil surrounding the path of displacement of the member and arranged so that a change in position of the member causes a variation in the inductance of the coil, and means for ascertaining the change in inductance of the coil with displacement of the member.

The inductance coil may form part of an oscillatory circuit and the measurement of the change of inductance is obtained by measuring the change of frequency of the oscillatory circuit due to variation in the inductance of the coil caused by variation in the displacement of the member.

Preferably the oscillatory circuit forms part of an oscillator the output of which is compared with the output of another like frequency oscillator, the difference frequency impulses providing a digital representation of the displacement of the member. The outputs may be compared in a beat frequency mixer of by feeding the outputs of the two oscillators respectively to the 'forwards count' input and the 'backwards count' input of a reversible or bi-direction counter, the resultant count providing a digital representation of the displacement.

Preferably the elongate member is a length of resistive wire of nickel chromium iron alloy sold under the trade name "Nichrome" and commonly used in the construction of resistive heating elements.

Embodiments of the invention will now be described with reference, by way of example, to the accompanying drawing in which:

FIG. 4 is a schematic diagram humidity measuring arrangement utilising the invention, and FIG. 5 is a schematic diagram of a temperature measuring arrangement utilising the invention.

Figure 1:
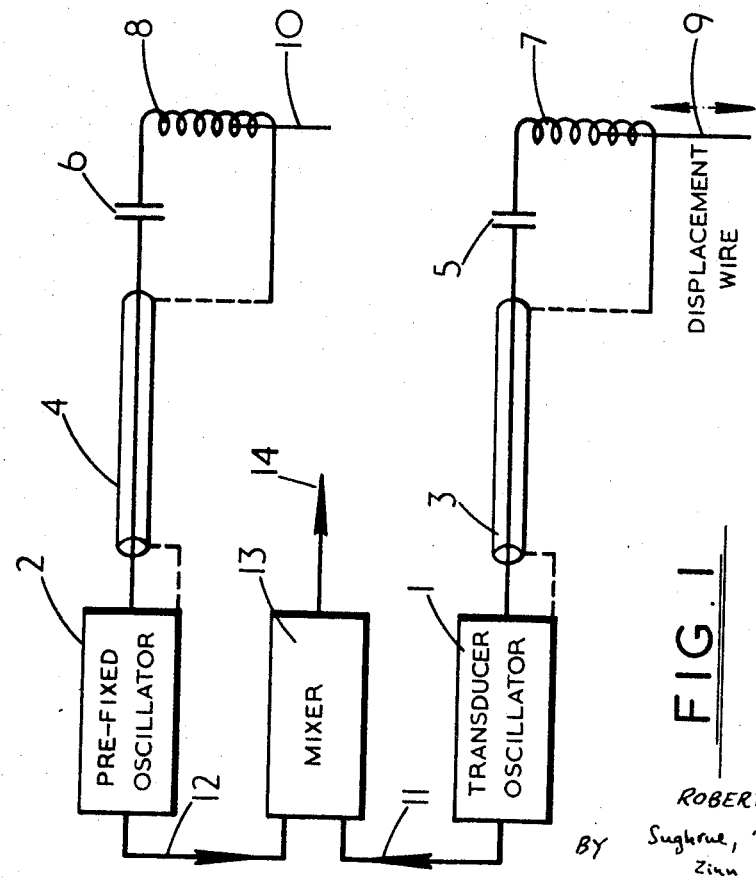
FIG. 1 is a schematic diagram of an embodiment of the invention.

Referring to FIG. 1, there are shown two substantially identical oscillators 1 and 2 which preferably share a dual transistor or are built up on an integrated circuit chip. Oscillator 1 is the transducer oscillator and is connected via a co-axial cable 3 and a series capacitor 5 to an inductance coil 7 which surrounds the path of a displaceable member 9, which member is a length of "Nichrome" wire, typically 1 mm in diameter. The oscillator 1 together with the capacitor 5 and coil 7 form a Clapp type oscillator (see FIG.2) providing an oscillatory output on line 11 to a mixer 13. Displacement of the wire 9 along the axis of coil 7 causes variation in the inductance of the coil and hence variation in the frequency of the output on line 11.

Oscillator 2 is a pre-fixed oscillator and similarly is connected via a co-axial cable 4 and a series capacitor 6 to an inductance coil 8. The inductance of coil 8 may be preset by adjustment of a length of "Nichrome" wire 10 which may also provide some temperature compensation against changes in length and characteristics of wire 9 due to temperature changes. The output of pre-fixed oscillator 2 is taken on line 12 to mixer 13, the output 14 of which provides a digital representation of the displacement of wire 9 which may be connected to any mechanical movement to be measured, for example a pressure capsule.

Figure 2:
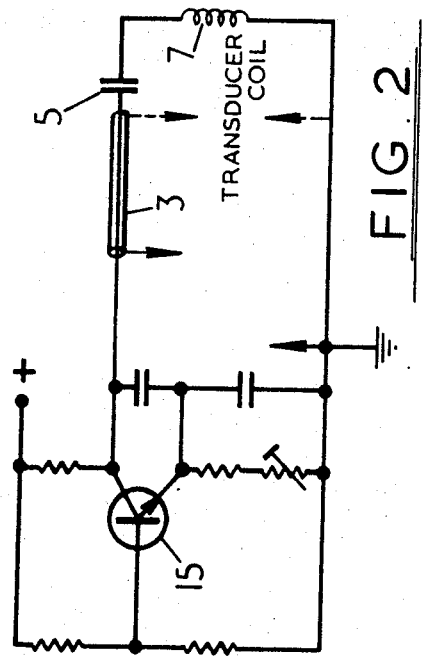
FIG. 2 is a circuit diagram of an oscillator which can advantageously be used in the embodiment of FIG. 1.

FIG. 2 is a circuit diagram of a Clapp oscillator which may be used in the embodiment of FIG. 1. The oscillatory circuit formed principally by capacitor 5 and coil 7 is connected between collector and emitter of a transistor 15 and ground. The advantage of the Clapp type of circuit is that the capacitance of the co-axial cable 3 has but a small effect on the resonant frequency of the oscillator so that a substantial length of cable may be used where necessary. Capacitor 5 may be positioned at the other end of the cable if there is a small amount of copper in the transducer coil 7 and temperature compensation is not required. However, preferably the capacitor is as shown and has a negative temperature co-efficient selected to obtain maximum temperature compensation according to the circuit constants.

Figure 3:
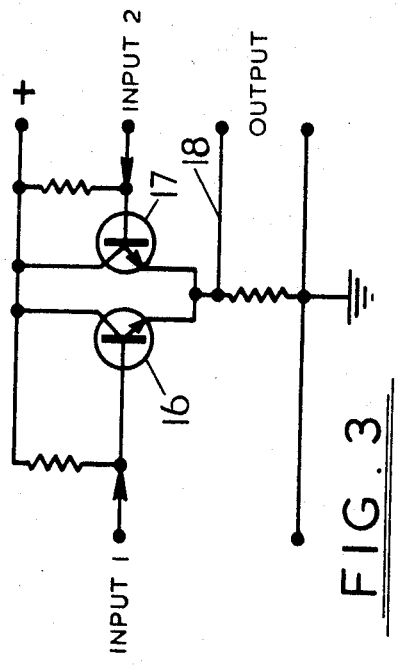
FIG. 3 is a circuit diagram of a mixer which may be used in the embodiment of FIG. 1.

FIG. 3 is a circuit diagram of a beat frequency mixer which may be used in the embodiment of FIG. 1 at 13. The outputs of oscillators 1 and 2 are respectively fed to the inputs of two transistors 16 and 17 (which may be combined in a dual transistor), the output being taken from a common emitter connection at 18.

Preferably an amplifying stage follows the mixer 13 and is given a cut-off frequency which is higher than the maximum beat frequency but well below the oscillator frequencies so as to avoid the oscillator frequencies passing into the counter or other, eg., encoding, circuits.

FIG. 4 shows a humidity measuring arrangement in accordance with the invention. The arrangement comprises a transducer coil 7 which is connected in circuit exactly as shown in FIG. 1. The displacement wire 9 is coupled to a humidity sensitive element 20 which is held in tension by a spring 21. The humidity sensitive element 20, may be a length of goldbeater's skin or 'roped' hemp, both of which tend to change in length wich change in moisture content. Any change in length displaces the wire 9 and causes a frequency change as already discussed.

FIG. 5 shows a temperature measuring arrangement in which there are displacement wires associated with both coils 7 and 8. The arrangement comprises a bi-metallic strip 22 clamped at one end in a thermometer pocket 23 and carrying, at the other end, displacement wires 9 and 19, wire 9 being displaceable in coil 7 and wire 19 being displaceable in coil 8. Coils 7 and 8 are connected to the oscillators as shown in FIG. 1. The adjustment wire 10 is provided as shown in FIG. 1. As is well known bi-metallic strip 22 changes its curvature with change in temperature and this causes the displacement wire 9 and 19 to move differentially relative to the coils, i.e., as wire 9 is moved into coil 7, wire 19 is withdraws coil 8, and vice-versa. Thus the frequency of one oscillator is increased while that of the other is decreased so that twice the frequency change results when comparing the frequency of one oscillator with the other.

A differential arrangement enables a measurement of twice the sensitivity to be obtained and can be used with any displacement arrangement. Additionally a degree of self compensation in relation to changes of temperature and characteristics, is obtained.

The above examples of uses of the invention are typical of many similar arrangements in which a mechanical movement is to be transduced into an electrical signal. According to which arrangement is most convenient in a particular circumstance the mechanical movement may be coupled to a single displacement wire operating in one of the coils or a double displacement wire arrangement operating differentially in conjunction with both coils.

What is claimed is:

1. A displacement transducer comprising an elongated means of high electrically resistive, non-magnetic material which is to be displaced in accordance with the displacement to be measured, an inductance coil surrounding the path of displacement of the elongated means such that a change in position of the elongated means causes a substantially linear variation in the inductance of the coil, and means for ascertaining the change in inductance of the coil with displacement of the elongated means.

2. A transducer as claimed in claim 1, wherein the inductance coil forms part of an oscillator circuit and the measurement of the change of inductance is obtained by measuring the change of frequency of the oscillator circuit due to variation in the inductance of the coil caused by variation in the displacement of the elongated means.

3. A transducer as claimed in claim 2, wherein the oscillator is of the Clapp type.

4. A transducer as claimed in claim 2, wherein the oscillatory circuit forms part of an oscillator the output of which is compared with the output of another like frequency oscillator, the difference frequency impulses providing a digital representation of the displacement of the elongated means.

5. A transducer as claimed in claim 4, wherein the other oscillator is a pre-fixed frequency oscillator.

6. A transducer as claimed in claim 4, wherein the other oscillator includes a coil and a second high electrically resistive elongated means which is moved differentially with the elongated means of the first oscillator.

7. A transducer as claimed in claim 4, wherein the outputs of the oscillators are compared in a beat frequency mixer circuit.

8. A transducer as claimed in claim 4, wherein the outputs of the oscillators are fed respectively to the 'forward count' input and the 'backwards count' input of a reversible or bi-direction counter, the resultant count providing a digital representation of the displacement.

9. A transducer as claimed in claim 1, wherein the elongated means is coupled to a humidity sensitive element resiliently held in tension such that changes in humidity result in the displacement of said elongated means, the measured output of the arrangement being a measure of the humidity.

10. A transducer as claimed in claim 1, wherein the elongated means is coupled to a temperature sensitive element such that changes in temperature result in the displacement of said elongated means, the measurement output of the arrangement being a measure of the temperature.

* * * * *